United States Patent
Kleinhans et al.

(10) Patent No.: US 10,302,023 B2
(45) Date of Patent: May 28, 2019

(54) METHOD AND CONTROL UNIT FOR CARRYING OUT A GAS EXCHANGE IN A CYLINDER OF AN INTERNAL COMBUSTION ENGINE AND INTERNAL COMBUSTION ENGINE HAVING SUCH A CONTROL UNIT

(71) Applicant: Volkswagen Aktiengesellschaft, Wolfsburg (DE)

(72) Inventors: René Kleinhans, Warenholz (DE); Stefan Klie, Braunschweig (DE); Maiko Garwon, Braunschweig (DE); Robert Beckmann, Hamburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 89 days.

(21) Appl. No.: 15/374,959

(22) Filed: Dec. 9, 2016

(65) Prior Publication Data
US 2017/0089271 A1    Mar. 30, 2017

Related U.S. Application Data

(63) Continuation of application No. PCT/EP2015/062914, filed on Jun. 10, 2015.

(30) Foreign Application Priority Data

Jun. 11, 2014  (DE) ......................... 10 2014 211 160

(51) Int. Cl.
*F02D 13/02* (2006.01)
*F02D 41/10* (2006.01)
(Continued)

(52) U.S. Cl.
CPC ..... *F02D 13/0215* (2013.01); *F02D 13/0234* (2013.01); *F02D 13/0249* (2013.01);
(Continued)

(58) Field of Classification Search
None
See application file for complete search history.

(56) References Cited

U.S. PATENT DOCUMENTS

| 5,309,886 A | 5/1994 | Hitomi et al. |
| 5,443,050 A | 8/1995 | Hitomi et al. |

(Continued)

FOREIGN PATENT DOCUMENTS

| DE | 4232456 A1 | 4/1993 |
| DE | 102004023590 A1 | 12/2005 |

(Continued)

OTHER PUBLICATIONS

WO 2014016926 English Language machine translation.*

(Continued)

*Primary Examiner* — Mark A Laurenzi
*Assistant Examiner* — Wesley G Harris
(74) *Attorney, Agent, or Firm* — Manfred Beck, P.A.

(57) ABSTRACT

A method for carrying out a gas exchange in a cylinder of an internal combustion engine is provided. The cylinder is connected to a gas line section via a valve. An actuator adjusts a gas pressure in the gas line section. The valve closes at a fixed point in time in a working cycle of the internal combustion engine in case of a constant torque of the internal combustion engine. The method includes the steps of recognizing a torque change request; determining a target value for the gas pressure in the gas line section in dependence on the torque change request; and determining a variable point in time for closing the valve as a result of the torque change request, wherein the variable point in time is shifted in the working cycle relative to the fixed point in time in dependence on the target value of the gas pressure.

20 Claims, 5 Drawing Sheets

(51) Int. Cl.
*F02D 41/00* (2006.01)
*F02D 41/26* (2006.01)

(52) U.S. Cl.
CPC ..... *F02D 13/0253* (2013.01); *F02D 13/0269* (2013.01); *F02D 13/0276* (2013.01); *F02D 41/0007* (2013.01); *F02D 41/107* (2013.01); *F02D 41/26* (2013.01); *F02D 2041/001* (2013.01); *F02D 2041/002* (2013.01); *F02D 2200/0404* (2013.01); *F02D 2200/0406* (2013.01); *F02D 2250/18* (2013.01); *F02D 2250/34* (2013.01); *Y02T 10/142* (2013.01); *Y02T 10/144* (2013.01)

(56) References Cited

U.S. PATENT DOCUMENTS

| | | | | |
|---|---|---|---|---|
| 6,058,348 | A * | 5/2000 | Ohyama | F01L 13/0036 |
| | | | | 123/294 |
| 2007/0068156 | A1 | 3/2007 | Rottenkolber et al. | |
| 2007/0168105 | A1 | 7/2007 | Wild | |
| 2007/0256653 | A1 | 11/2007 | Budack et al. | |
| 2009/0314264 | A1 | 12/2009 | Takahashi et al. | |
| 2011/0126519 | A1 | 6/2011 | Okada | |
| 2013/0206104 | A1 | 8/2013 | Kühlmeyer et al. | |
| 2014/0366854 | A1 | 12/2014 | Hoffmeyer et al. | |
| 2015/0128904 | A1 | 5/2015 | Yu | |
| 2015/0134230 | A1 | 5/2015 | Hoffmeyer et al. | |
| 2015/0184606 | A1* | 7/2015 | Soejima | F02D 11/105 |
| | | | | 123/346 |

FOREIGN PATENT DOCUMENTS

| | | | |
|---|---|---|---|
| DE | 102004026405 A1 | 12/2005 | |
| DE | 112009001744 T5 | 9/2011 | |
| DE | 102010045710 A1 | 3/2012 | |
| DE | 102011122442 A1 | 6/2013 | |
| DE | 102012014713 A1 | 1/2014 | |
| EP | 2878791 A1 | 6/2015 | |
| JP | WO 2014016926 A1 * | 1/2014 | ............ F02D 11/105 |
| RU | 2387859 C2 | 4/2010 | |
| RU | 2419725 C2 | 5/2011 | |
| WO | 96/26357 A1 | 8/1996 | |
| WO | 2005/116426 A1 | 12/2005 | |
| WO | 2014/016926 A1 | 1/2014 | |

OTHER PUBLICATIONS

Search Report issued by the Federal Institute of Industrial Property, dated Mar. 13, 2018.
Search Report including Provisional Assessment of Patentability issued by the German Patent and Trademark Office for German Patent Application No. DE 10 2014 211 160.9, dated Jan. 20, 2015.
International Search Report for International Application No. PCT/EP2015/062914 and translation thereof, dated Sep. 9, 2015.
International Preliminary Report on Patentability for International Application No. PCT/EP2015/062914 with accompanying amended sheets of the description and claims and including Written Opinion of the International Searching Authority and translation thereof, dated Oct. 4, 2016.

* cited by examiner

METHOD AND CONTROL UNIT FOR CARRYING OUT A GAS EXCHANGE IN A CYLINDER OF AN INTERNAL COMBUSTION ENGINE AND INTERNAL COMBUSTION ENGINE HAVING SUCH A CONTROL UNIT

CROSS-REFERENCE TO RELATED APPLICATIONS

This application is a continuation, under 35 U.S.C. § 120, of copending International Application No. PCT/EP2015/062914, filed Jun. 10, 2015, which designated the United States; this application also claims the priority, under 35 U.S.C. § 119, of German Patent Application No. DE 10 2014 211 160.9, filed Jun. 11, 2014; the prior applications are herewith incorporated by reference in their entirety.

BACKGROUND OF THE INVENTION

Field of the Invention

The invention relates to a method and a control unit for carrying out a gas exchange in a cylinder of an internal combustion engine. The invention also relates to an internal combustion engine having such a control unit, and to a motor vehicle having such an internal combustion engine.

In internal combustion engines, a gas exchange takes place after every combustion process. The manner in which this gas exchange is carried out substantially influences the fuel consumption and the pollutant emissions of the internal combustion engine. It is necessary, therefore, to configure the gas exchange in such a way that a cylinder charge contains certain portions of fresh air, residual gas, and purge air.

In a four-stroke engine, the four process steps of intake, compression, combustion, and exhaust are usually carried out. In a conventional Otto-cycle engine, the intake valve is opened during intake, shortly before the piston has reached top dead center, wherein the exhaust valve remains open. After top dead center has been passed through, the exhaust valve is closed. The intake valve is closed again only after the piston has reached bottom dead center. An internal combustion engine based on the Miller principle differs from an Otto-cycle engine in that the intake valve closes very early as compared to the Otto-cycle engine, whereby the quantity of air in the cylinder is reduced. Given that the intake valve has already been closed before bottom dead center is reached, the expansion volume is increased without the compression pressure being increased, whereby fuel is saved and the temperature in the cylinder is lower than in an Otto-cycle engine.

There are different ways to control the portions of fresh air, residual gas, and purge air in the cylinder charge. It is known, for example, to regulate the charging of the cylinder in a suitable way by adjusting a throttle valve in the intake manifold, whereby the intake manifold pressure is changed. Due to the large volume of the intake manifold, pressure changes set in with a delay, and therefore a charge control via the throttle valve is sluggish. Alternatively, there are different approaches for controlling the cylinder charge via the valve train. Such a charge control requires, however, that the pressure conditions in the intake manifold and in the manifold are precisely known. This is not readily possible with regard to the exhaust gas back pressure in the exhaust port or in the manifold, which has a non-negligible influence on the cylinder charge.

International Application WO 2014/16926 A1 describes a method for charging an engine. In this case, as a result of a torque demand, opening and closing times of an intake valve are determined on the basis of the intake manifold pressure, through the use of a characteristic map, and a target intake manifold pressure is determined on the basis of the opening and closing times of the intake valve. This target intake manifold pressure is then used as the basis for adjusting the throttle valve and the exhaust valve.

SUMMARY OF THE INVENTION

It is accordingly an object of the invention to provide a method and a control device for carrying out a gas exchange in a cylinder of an internal combustion engine and an internal combustion engine having such a control device, which at least partially overcome the aforementioned disadvantages of the heretofore-known methods and devices of this general type.

With the foregoing and other objects in view there is provided, in accordance with the invention, a method for carrying out a gas exchange in a cylinder of an internal combustion engine, which includes the steps of:

providing the internal combustion engine such that the cylinder is connected, via a valve, to a gas line section and providing, in the gas line section, an actuator for adjusting a gas pressure in the gas line section, wherein the valve closes at a fixed point in time in a working cycle of the internal combustion engine in case of a constant torque of the internal combustion engine;

recognizing a torque change request;

determining a target value for the gas pressure in the gas line section in dependence on the torque change request and subsequently determining a variable point in time for closing the valve as a result of the torque change request, wherein the variable point in time is shifted in the working cycle relative to the fixed point in time in dependence on the target value of the gas pressure; and controlling the actuator as a result of the torque change request in such a way that the target value of the gas pressure prevails in the gas line section.

In other words, in accordance with the invention, there is provided a method for carrying out a gas exchange in a cylinder of an internal combustion engine, wherein the cylinder is connected via a valve to a gas line section, in which an actuator for adjusting a gas pressure in the gas line section is provided, wherein the valve closes upon constant torque of the internal combustion engine at a fixed point in time in a working cycle of the internal combustion engine, wherein the method includes the steps of recognizing a torque change request; determining a target value for the gas pressure in the gas line section depending on the torque change request; subsequently determining a variable point in time for closing the valve as a result of the torque change request, wherein the variable point in time is shifted in the working cycle relative to the fixed point in time depending on the target value of the gas pressure, and controlling the actuator as a result of the torque change request in such a way that the target value for the gas pressure, which is determined depending on the torque change request, sets in in the gas line section.

Another mode of the invention includes determining the target value for the gas pressure by using characteristic maps.

Another mode of the invention includes determining the fixed point in time based on a charge detection model.

Another mode of the invention includes closing the valve at the variable point in time during at least one working cycle in response to the torque change request, or closing the valve at the variable point in time in a first working cycle after the torque change request in response to the torque change request and, in directly subsequent working cycles, closing the valve at adapted points in time, wherein the adapted points in time lie between the variable point in time and the fixed point in time. In other words, the valve is closed, in response to the torque change request, at the determined variable point in time during one or multiple working cycles, or the valve is closed, in response to the torque change request, at the determined variable point in time in a first working cycle after the torque change request and, in directly subsequent engine cycles, at adapted points in time which lie between the variable point in time and the fixed point in time.

Another mode of the invention includes closing the valve at the variable point in time in response to the torque change request until an actual value for the gas pressure reaches the target value for the gas pressure, and subsequently closing the valve at the fixed point in time, or closing the valve at adapted points in time in response to the torque change request, wherein the adapted points in time lie in an interval between the variable point in time and the fixed point in time and wherein the interval includes the variable point in time, until an actual value for the gas pressure reaches the target value for the gas pressure, and subsequently closing the valve at the fixed point in time. In other words, the valve is closed, in response to the torque change request, at the determined variable point in time or at adapted points in time, which lie in an interval between the variable point in time and the fixed point in time enclosing the variable point in time, for as long as necessary until an actual value for the gas pressure reaches the target value for the gas pressure, and is subsequently closed at the fixed point in time.

According to another mode of the invention, the valve is an intake valve; the gas line section is an intake manifold connected to the cylinder via the intake valve; and the actuator for adjusting a gas pressure in the gas line section is a throttle valve for adjusting an intake manifold pressure in the intake manifold, wherein the throttle valve is disposed in the intake manifold.

According to another mode of the invention, the valve is an exhaust valve; the gas line section is an exhaust port section connected to the cylinder via the exhaust valve; and the actuator for adjusting a gas pressure in the gas line section is an exhaust gas turbocharger for adjusting an exhaust gas back pressure in the exhaust port section, wherein the exhaust gas turbocharger is disposed in the exhaust port section.

Another mode of the invention includes providing the valve as an exhaust valve; providing the gas line section as an exhaust port section connected to the cylinder via the exhaust valve; providing the actuator for adjusting a gas pressure in the gas line section as an exhaust gas turbocharger for adjusting an exhaust gas back pressure in the exhaust port section, wherein the exhaust gas turbocharger is disposed in the exhaust port section; connecting the cylinder, via an intake valve, to an intake manifold; providing a throttle valve for adjusting an intake manifold pressure, wherein the throttle valve is provided in the intake manifold; closing the intake valve at an intake valve-related, fixed point in time in the working cycle in case of a constant torque of the internal combustion engine; determining, in addition to determining the target value for the gas pressure in the gas line section, a target value for the intake manifold pressure in the intake manifold in dependence on the torque change request; and determining an intake valve-related, variable point in time for closing the intake valve as a result of the torque change request, wherein the intake valve-related, variable point in time is shifted in the working cycle relative to the intake valve-related, fixed point in time in dependence on the target value of the intake manifold pressure. In other words, the cylinder is also connected via an intake valve to an intake manifold in which a throttle valve is provided for adjusting an intake manifold pressure, wherein the intake valve closes upon constant torque of the internal combustion engine at an intake valve-related, fixed point in time in the working cycle, wherein the method includes the additional steps of determining a target value for the intake manifold pressure in the intake manifold depending on the torque change request, and determining an intake valve-related, variable point in time for closing the intake valve as a result of the torque change request, wherein the intake valve-related, variable point in time is shifted in the working cycle relative to the intake valve-related, fixed point in time depending on the target value of the intake manifold pressure.

According to another mode of the invention, the torque change request includes a request for increasing an engine torque, and the intake valve-related, variable point in time for closing the intake valve lies later in the working cycle than the intake valve-related, fixed point in time.

Another mode of the invention includes providing the intake valve-related, fixed point in time in an intake phase of the working cycle before a maximum volume of the cylinder is reached.

Another mode of the invention includes additionally providing an adjusting device for influencing the gas exchange and controlling the adjusting device by determining a target value for a position of the adjusting device in dependence on the torque change request. In other words, the internal combustion engine contains an additional adjusting device for influencing the gas exchange, which is controlled by way of determining a target value for the position of the adjusting device depending on the torque change request.

One method according to the invention for carrying out a gas exchange in a cylinder of an internal combustion engine is based on a configuration of the internal combustion engine, in which the cylinder is connected via a valve to a gas line section, in which an actuator for adjusting a gas pressure in the gas line section is provided. The valve is controlled in such a way that the valve closes upon constant torque of the internal combustion engine at a fixed point in time in a working cycle of the internal combustion engine. In accordance with the method according to the invention, a torque change request is initially detected. After the torque change request is detected, a target value for the gas pressure in the gas line section is determined depending on the torque change request. According to a subsequent step of the method according to the invention, a variable point in time for closing the valve due to the torque change request is determined. The variable point in time is shifted in the working cycle relative to the fixed point in time depending on the target value of the gas pressure.

The fixed point in time is the point in time in the working cycle of the internal combustion engine, at which the valve closes when the internal combustion engine is in a type of state of equilibrium, i.e., when the torque of the internal combustion engine and the state variables such as the pressures and temperatures in the internal combustion engine are held substantially constant.

In many exemplary embodiments, the valve can be an intake valve and the gas pressure can be an intake manifold pressure. The fixed point in time can then be a point in time at which a piston of the internal combustion engine is situated in a position, in which a cylinder volume is not yet maximal, i.e., in which the piston has not yet reached bottom dead center. In other words, the fixed point in time can be the point in time at which the intake valve closes—during the Miller cycle—when a torque change request is not present.

In many exemplary embodiments, the valve can be an exhaust valve and the gas pressure can be an exhaust gas back pressure. The fixed point in time can then be a point in time at which a piston of the internal combustion engine is situated in a position in which a cylinder volume is minimal or has just become no longer minimal, i.e., in which the piston is at top dead center or has just passed through top dead center.

In many exemplary embodiments, the fixed point in time can be determined on the basis of a charge detection model. In order to generate the charge detection model, measured values which were measured on a test stand, and/or simulation values relating to one or multiple state variables of the internal combustion engine can be utilized. A different fixed point in time can be selected depending on the values of the state variables, for example, the pressure ratios or pressure conditions. In these exemplary embodiments, in the event of a torque change request, the shifting point can be shifted for example relative to a fixed point in time which was most recently determined.

The torque change request can include, for example, a requested target torque.

The torque change request can be, for example, a command from a control unit. This command can be, e.g., output by setting a bit and can be detected by reading out the bit. In a motor vehicle, the torque change request can be, e.g., a command from the engine control unit (ECU) to increase an engine torque, which command is transmitted by the engine control unit in response to an actuation of the gas pedal.

An amount of the shift of the variable point in time in the working cycle can also depend on an actual value of the gas pressure. The variable point in time in the working cycle can therefore also be determined depending on an actual value of the gas pressure relative to the fixed point in time. For example, the variable point in time in the working cycle can be determined depending on a deviation in the intake manifold pressure, wherein the deviation is a difference between the target value and the actual value of the intake manifold pressure.

The target value with regard to the gas pressure in the gas line section can be determined, for example, with the aid of one or multiple characteristic maps. In many exemplary embodiments, the characteristic maps can have been generated in advance on the basis of measurements performed on a test stand and/or on the basis of test measurements performed on the internal combustion engine and/or on the basis of simulations, with the aid of calculations or simulations, and therefore the target value for the gas pressure can be read from the characteristic map(s).

In many other exemplary embodiments, a target value for a state variable associated with the gas pressure in the gas line section can be determined with the aid of one or multiple characteristic maps, and the target value for the gas pressure can be calculated on the basis of the target value of this state variable. Alternatively, instead of the characteristic maps, after recognition of the torque change request, a simulation or another calculation of the target value of the gas pressure or the target value of the state variable associated with the gas pressure can be carried out. The state variable associated with the gas pressure will be addressed in greater detail further below.

On the basis of the gas pressure the variable point in time for closing the valve can be determined with the aid of a charge detection model, that for example takes into account the effect of the position of the actuator and the effect of the closing time of the valve, or the variable point in time for closing the valve can be determined with the aid of path models.

The method for carrying out a gas exchange can also include the step that the actuator is controlled in response to the torque change request in such a way that the target value for the gas pressure, which is determined depending on the torque change request, prevails in the gas line section. The actuator can be an air flow damper (flow valve), for example, a throttle valve. The air flow damper can be adjusted in such a way that a flow cross section in the gas line section is increased or decreased. As a result, the gas pressure in the gas line section can be influenced. In many examples, the gas pressure in the gas line section can be reduced by increasing the flow cross section, and the gas pressure can be increased by reducing the flow cross section. Alternatively, the actuator can be a combination of a gas turbine and a compressor, for example, a turbocharger. In order to permit regulation of the gas pressure in the gas line section, flow blades of the compressor can be adjusted accordingly.

In the case of very brief torque change requests which last, for example, for only a few engine cycles, the adjustment of the gas pressure in the gas line section can be dispensed with and the requests can be responded to only by shifting the closing time of the valve. The desired cylinder charge can take place very rapidly through the use of this control.

As a result of the torque change request, the valve can be closed at a certain variable point in time during one or multiple working cycles or engine cycles. The closing of the valve can be, for example, a switch from a fully open state to a fully closed state. In many exemplary embodiments, in response to the torque change request, the actuator is also adjusted in such a way that the actual value of the gas pressure approaches the target value of the gas pressure. The valve can be closed at the determined variable point in time for as long as necessary, i.e., for as many working cycles or engine cycles as necessary, until the actual value reaches the target value of the gas pressure. Due to the closing of the valve at the variable point in time, the delay in the setting of the gas pressure can be compensated for.

In many exemplary embodiments, the valve can be closed, in response to the torque change request, at the determined variable point in time in a first engine cycle after the torque change request and, in directly subsequent engine cycles, at adapted points in time which lie between the variable point in time and the fixed point in time. The closing times of the valve during the engine cycles following the first engine cycle can be moved, for example, incrementally, toward the fixed point in time. Since the actuator can be controlled simultaneously with the shifting of the closing time, the valve can be closed at a point in time, which lies between the fixed point in time and the variable point in time, for as long as necessary until an actual value associated with the gas pressure corresponds to the target value associated with the gas pressure. Subsequently, the valve can be closed again at the fixed point in time.

In many exemplary embodiments, the valve can be an intake valve, the gas line section can be an intake manifold which is connected to the cylinder via the intake valve, and the actuator for adjusting a gas pressure in the gas line section can be a throttle valve for adjusting an intake manifold pressure in the intake manifold, which throttle valve is situated in the intake manifold. This means that a target value for the intake manifold pressure is determined in response to a torque change request and the point in time at which the intake valve is closed is determined on the basis of this target value.

The torque change request can be a request, for example, to increase the torque of the internal combustion engine. The torque change request can include, for example, a corresponding target torque. In this case, the target value for the intake manifold pressure can be greater than the actual value of the intake manifold pressure, since a fresh-air mass in the cylinder must be increased in order to increase the torque of the internal combustion engine. Correspondingly, the variable point in time can lie after the fixed point in time. Alternatively, the torque change request can also contain a request to reduce the torque. In this case, the target value for the intake manifold pressure can be less than the actual value of the intake manifold pressure, since the quantity of fresh air in the cylinder is to be reduced. Correspondingly, the variable point in time can lie temporally before the fixed point in time. One example of how the variable point in time is selected in the case of a request for an increase in the torque is described in detail further below.

In many other exemplary embodiments, the valve can be an exhaust valve, the gas line section can be an exhaust port section which is connected to the cylinder via the exhaust valve, and the actuator for adjusting a gas pressure in the gas line section can be an exhaust gas turbocharger for adjusting an exhaust gas back pressure in the exhaust port section, which exhaust gas turbocharger is situated in the exhaust port section. This means that a target value for the exhaust gas back pressure is determined in response to a torque change request, and the point in time at which the exhaust valve is closed is determined on the basis of this target value.

The torque change request can include a request to increase the torque. The torque change request can include, for example, a corresponding target torque. In this case, the target value for the exhaust gas back pressure can be less than the actual value, since a fresh air mass in the cylinder must be increased in order to increase the torque of the internal combustion engine and, therefore, a residual gas portion in the cylinder should be reduced. Correspondingly, the exhaust valve can be closed at the variable point in time which lies before the fixed point in time. Alternatively, the torque change request can also contain a request for reducing the torque. In this case, the target value for the exhaust gas back pressure can be greater than the actual value of the exhaust gas back pressure, since the quantity of residual gas in the cylinder is to be increased. Correspondingly, the exhaust valve can be closed after the fixed point in time. One example of how the variable point in time is selected in the case of a request for an increase in the torque is described in detail further below.

In many exemplary embodiments, the internal combustion engine can include two gas line sections, each of which has a valve and an actuator. In these internal combustion engines, one or both valves can be closed in accordance with the method according to the invention.

For example, the cylinder can be connected via an intake valve to an intake manifold in which a throttle valve is provided for adjusting an intake manifold pressure, and the cylinder can be connected via an exhaust valve to an exhaust port in which a turbocharger is provided for adjusting the exhaust gas back pressure. The intake valve can close upon constant torque of the internal combustion engine or upon constant engine torque at an intake valve-related fixed point in time in the working cycle or in the engine cycle, and the exhaust valve can close upon constant engine torque at an exhaust valve-related fixed point in time in the engine cycle. As soon as a torque change request is recognized, a target value for the intake manifold pressure in the intake manifold can be determined depending on the torque change request, and a target value for the exhaust gas back pressure in the exhaust port can be determined depending on the torque change request. Subsequently, an intake valve-related, variable point in time for closing the intake valve in response to the torque change request and an exhaust valve-related, variable point in time for closing the exhaust valve in response to the torque change request can be determined. The intake valve-related, variable point in time in the engine cycle can be shifted relative to the intake valve-related, fixed point in time depending on the target value of the intake manifold pressure. The exhaust valve-related, variable point in time in the engine cycle can be shifted relative to the exhaust valve-related, fixed point in time depending on the target value of the exhaust gas back pressure.

In the case of internal combustion engines having two gas line sections, each of which has a valve and an actuator, if only one of the valves is closed in accordance with the method according to the invention, the other valve can be controlled with the aid of characteristic maps which were created in advance with the aid of measurements performed on a test stand and/or with the aid of simulations. Such a control is described in detail further below.

As mentioned above, the torque change request can include a request for an increase in the engine torque. In response to such a torque change request, the variable point in time for closing the intake valve can lie later in the engine cycle than the fixed point in time. The fixed point in time in an intake phase of the engine cycle can lie before the point at which a maximum volume of the cylinder is achieved. This is explained in the following on the basis of an example:

In a working cycle of the internal combustion engine, the intake process can start, for example, when the cylinder volume is minimal or when the piston reaches top dead center, and the intake process can end when the cylinder volume is maximal or when the piston reaches bottom dead center. If the internal combustion engine is operated in the Miller cycle, the intake process can be ended by closing the intake valve even in the case of a cylinder volume which is less than the maximum cylinder volume, whereby advantages result with regard to fuel consumption and temperature. This closing time can be the fixed point in time. If a torque change request is now recognized (in this case, a request for a torque increase), the valve can be closed at the variable point in time which lies after the fixed point in time. The variable point in time can be, for example, the point in time at which the cylinder volume is maximal or is greater than the cylinder volume at the fixed point in time. As a result of shifting the closing time of the intake valve to the variable point in time which is later than the fixed point in time, the cylinder volume at the end of the intake process can be increased, so that more fresh air can flow into the cylinder given essentially the same intake manifold pressure. Since the throttle valve can also be adjusted in response to the request for a torque increase, the target value for the intake manifold pressure can set in with delay in the intake manifold. In many exemplary embodiments, the intake valve can be closed at the variable point in time or at a point in time between the fixed point in time and the variable point in time until the target value of the intake manifold pressure has been reached. In this way, torque change requests can be responded to very quickly, wherein the mechanisms of the fuel-efficient valve control are simultaneously retained.

Similarly to that described above with regard to the intake valve, in response to a request to increase the engine torque, the variable point in time for closing the exhaust valve can lie earlier in the engine cycle than the fixed point in time. The fixed point in time for closing the exhaust valve in an intake phase of the engine cycle can lie after the point at which a minimal volume of the cylinder is achieved, i.e., when top dead center, which defines the beginning of intake, has already been passed through. In response to a request to increase the torque of the internal combustion engine, a target value for the exhaust gas back pressure can now be determined. In this case, the target value for the exhaust gas back pressure can be less than the actual value, since a residual gas portion in the cylinder should be reduced in order to increase the torque of the internal combustion engine. As a result of shifting the closing time of the exhaust valve to the variable point in time which is earlier than the fixed point in time, less residual gas can be drawn into the cylinder during intake, for example, and therefore more space remains for fresh air. Since the turbocharger can also be adjusted in response to the request for a torque increase, the target value for the exhaust gas back pressure can set in with delay in the exhaust port or in the manifold. In many exemplary embodiments, the exhaust valve can be closed at the variable point in time or at a point in time between the fixed point in time and the variable point in time until the target value of the exhaust gas back pressure has been reached. In this way, torque change requests can be responded to very quickly, wherein the mechanisms of the fuel-efficient valve control are simultaneously taken into account.

The internal combustion engine can additionally contain an adjusting device or adjusting devices for influencing the gas exchange, for example, a valve of an external exhaust gas recirculation. The additional adjusting devices, the actuators, for example, the throttle valve and/or the turbocharger, and/or a valve which is switched not in accordance with the method according to the invention, can be controlled by way of determining a target value for the position of the adjusting device, the actuators, and/or the valve depending on the torque change request. The particular target value can be determined, for example, with the aid of one or multiple characteristic maps. In many exemplary embodiments, the characteristic maps can have been generated in advance on the basis of measurements performed on a test stand and/or on the basis of test measurements performed on the internal combustion engine and/or on the basis of simulations, with the aid of calculations or simulations, and therefore the target value for the gas pressure can be read from the characteristic map(s). In many other exemplary embodiments, a target value for a state variable associated with the position of the adjusting device, the actuator or the valve can be determined with the aid of one or multiple characteristic maps, and the position of the adjusting device, the actuator, or the valve can be calculated on the basis of the target value of this state variable. Alternatively, instead of the characteristic maps, after recognition of the torque demand, a simulation or another calculation of the position of the adjusting device, the actuator, or the valve, or another calculation of the target value of the state variable associated with the position of the adjusting device, the actuator, or the valve is carried out.

The state variable can be, for example, a relative amount of fresh air, an amount of internally recirculated residual gas, an amount of externally recirculated residual gas, the volumetric efficiency, a pressure differential across the actuator, or a scavenging rate. Fresh air is considered to be the air which is allowed into the cylinder. The fresh air can be a gas mixture, the composition of which is the same as that of the air in the atmosphere, or it can be a gas-fuel mixture. In contrast thereto, the residual gas is an oxygen-poor gas mixture, which is let out of the cylinder after the combustion process. The volumetric efficiency is defined as the ratio of the fresh-air mass and the maximum amount of air mass which can be accommodated in the maximum cylinder volume. Scavenging is considered to be a process in which both the intake valve and the exhaust valve are open in the transition interval between exhaust and intake.

With the objects of the invention in view there is also provided, a control device for carrying out a gas exchange in a cylinder of an internal combustion engine, wherein the cylinder is connected via a valve to a gas line section, wherein an actuator for adjusting a gas pressure in the gas line section is provided in the gas line section, wherein the valve closes at a fixed point in time in a working cycle of the internal combustion engine in case of a constant torque of the internal combustion engine, wherein the control device includes:

an interface for receiving a torque change request;
a processor module operatively connected to the interface;
the processor module recognizing a torque change request;
the processor module determining a target value for the gas pressure in the gas line section in dependence on the torque change request, and the processor module subsequently determining a variable point in time for closing the valve as a result of the torque change request, wherein the variable point in time is shifted in the working cycle relative to the fixed point in time in dependence on the target value of the gas pressure; and
the processor module effecting a control of the actuator as a result of the torque change request such that the target value of the gas pressure prevails in the gas line section.

In other words, with the objects of the invention in view there is provided a control device for carrying out a gas exchange in a cylinder of an internal combustion engine, in particular in accordance with the method steps described above, wherein the cylinder is connected via a valve to a gas line section, in which an actuator for adjusting a gas pressure in the gas line section is provided, wherein the valve closes upon constant torque of the internal combustion engine at a fixed point in time in a working cycle of the internal combustion engine, and wherein the control device includes:

an interface for receiving a torque change request; and
a processor module
for determining a target value for the gas pressure in the gas line section depending on the torque change request and
for determining a variable point in time for closing the valve as a result of the torque change request, wherein the variable point in time is shifted in the working cycle relative to the fixed point in time depending on the target value of the gas pressure.

In accordance with a feature of the invention, the control device further includes a memory, wherein the memory stores target values for the gas pressure in the gas line section in dependence on the torque change request and/or information for determining the variable point in time in dependence on the target value for the gas pressure.

As described above, the present invention also relates to a control device for carrying out a gas exchange in a cylinder of an internal combustion engine. For example, the control device for carrying out the above-described method can be configured for carrying out a gas exchange in a cylinder. The control device is based on an embodiment of the internal combustion engine, in which the cylinder is connected via a valve to a gas line section in which an actuator is provided for adjusting a gas pressure in the gas line section. The control device is configured in such a way that the control device closes the valve upon constant torque of the internal combustion engine at a fixed point in time in a working cycle of the internal combustion engine. The control device contains an interface for receiving a torque change request, and a processor module. The processor module is configured for determining a target value for the gas pressure in the gas line section depending on the torque change request, and for determining a variable point in time for closing the valve as a result of the torque change request, wherein the variable point in time is shifted in the working cycle relative to the fixed point in time depending on the target value of the intake manifold pressure.

The interface can be a hardware interface. The interface can be configured for connecting the control device to an ECU or directly or indirectly to the gas pedal, and for enabling a data transfer, i.e., a transfer of a command containing the torque change request, for example, a target torque, to the control device. The processor module can include electronic components, such as a microprocessor. The processor module can contain a target value determination module for determining the target value of the gas pressure and a point-in-time determination module for determining the variable point in time depending on the gas pressure and the torque change request.

The control device can also contain a memory, in which target values associated with the gas pressure in the gas line section are stored depending on the torque change request and/or information for determining the variable point in time depending on the gas pressure. The memory can be a data memory.

The control device can further be configured for carrying out the features, which are described with regard for the method, individually or in arbitrary combinations.

With the objects of the invention in view there is further provided, an internal combustion engine, including:
a cylinder;
a valve;
a gas line section, the cylinder being connected to the gas line section via the valve;
an actuator for adjusting a gas pressure in the gas line section, the actuator being provided in the gas line section;
a control device for carrying out a gas exchange in the cylinder;
the control device including a processor module and an interface, the interface being configured to receive a torque change request;
the processor module recognizing a torque change request, the processor module determining a target value for the gas pressure in the gas line section in dependence on the torque change request, and the processor module subsequently determining a variable point in time for closing the valve as a result of the torque change request, wherein the variable point in time is shifted in a working cycle of the internal combustion engine relative to a fixed point in time in dependence on the target value of the gas pressure; and
the control device controlling the valve such that the valve closes at the fixed point in time in the working cycle of the internal combustion engine in case of a constant torque of the internal combustion engine and such that the valve closes at the variable point in time in response to the torque change request; and
the control device effecting a control of the actuator as a result of the torque change request such that the target value of the gas pressure prevails in the gas line section.

In accordance with another feature of the invention, the internal combustion engine further includes an adjusting device for influencing the gas exchange, wherein the adjusting device is controlled by way of determining a target value for a position of the adjusting device in dependence on the torque change request.

According to another feature of the invention, the valve is an intake valve of the internal combustion engine; the gas line section is an intake manifold connected to the cylinder via the intake valve; and the actuator for adjusting a gas pressure in the gas line section is a throttle valve for adjusting an intake manifold pressure in the intake manifold, wherein the throttle valve is disposed in the intake manifold.

According to another feature of the invention, the valve is an exhaust valve of the internal combustion engine; the gas line section is an exhaust port section connected to the cylinder via the exhaust valve; and the actuator for adjusting a gas pressure in the gas line section is an exhaust gas turbocharger for adjusting an exhaust gas back pressure in the exhaust port section, wherein the exhaust gas turbocharger is disposed in the exhaust port section.

As described above, the present invention also relates to an internal combustion engine having a control device of the type described above, and a cylinder. The cylinder is connected via a valve to a gas line section, in which an actuator is provided for adjusting a gas pressure in the gas line section. The valve can be controlled through the use of the control device in such a way that the valve closes upon constant torque of the internal combustion engine at a fixed point in time in a working cycle of the internal combustion engine and in such a way that the valve closes in response to a torque change request at a variable point in time, wherein the variable point in time is shifted in the working cycle relative to the fixed point in time depending on a target value of the gas pressure.

The internal combustion engine can contain an intake valve, via which the cylinder is connected to an intake manifold, in which a throttle valve is provided, and an exhaust valve, via which the cylinder is connected to an exhaust port, in which a turbocharger is provided. The internal combustion engine can be configured in such a way that the intake valve and/or the exhaust valve can be closed as a result of a torque demand at an intake valve-related, variable point in time or, respectively, at an exhaust valve-related, variable point in time.

Many exemplary embodiments also relate to a motor vehicle having an internal combustion engine of the type described above.

Although the invention is illustrated and described herein as embodied in a method and a control device for carrying out a gas exchange in a cylinder of an internal combustion engine and an internal combustion engine having such a control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
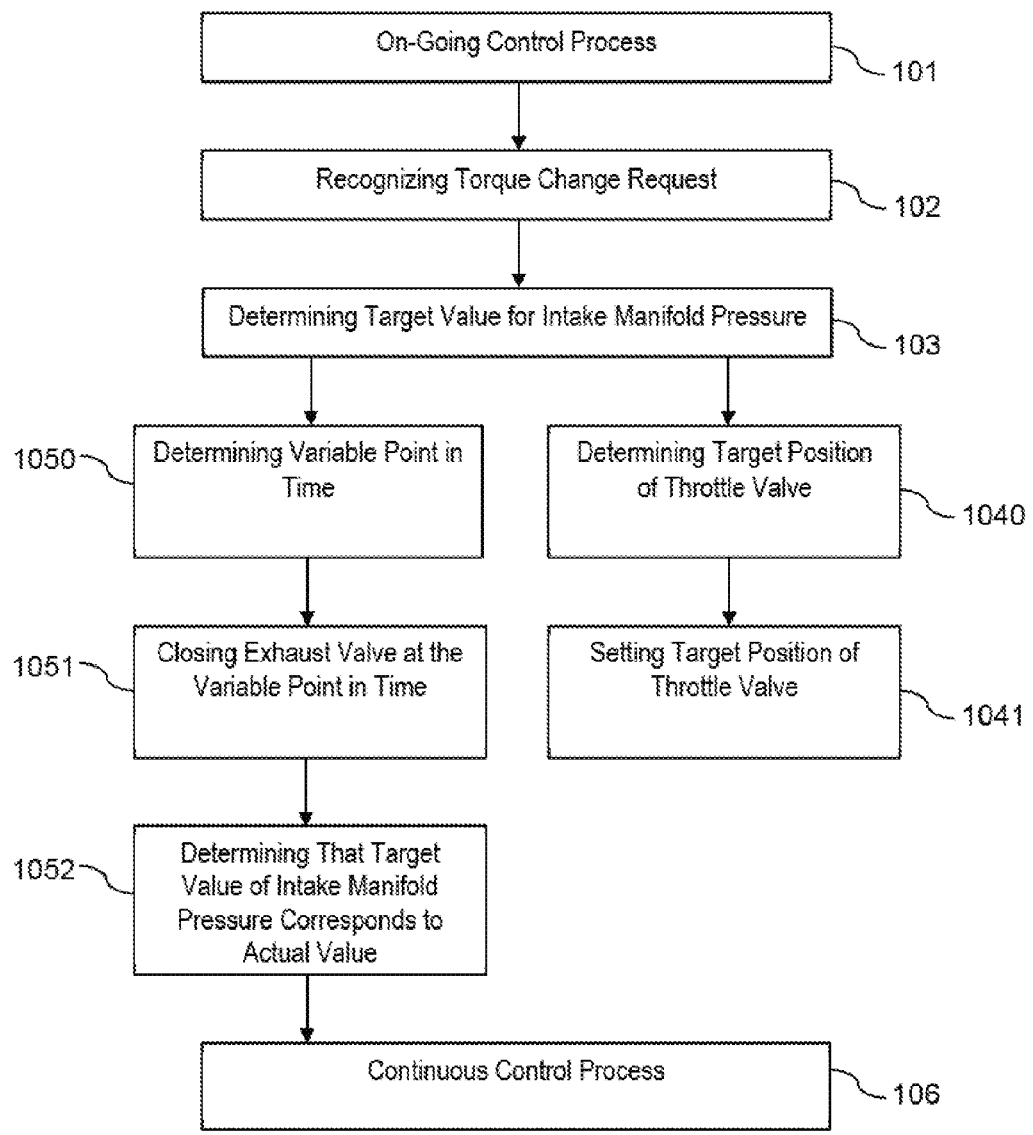
FIG. 1 is a flow chart schematically illustrating the method according to the invention.

Referring now to the figures of the drawing in detail and first, particularly, to FIG. 1 thereof, there is schematically represented an exemplary embodiment of a method 10 for carrying out a gas exchange in a cylinder of an internal combustion engine according to the invention. For this purpose, the internal combustion engine includes a cylinder, which is connected via an intake valve to an intake manifold, in which a throttle valve is provided for adjusting an intake manifold pressure.

In an on-going control process 101, during which the torque of the internal combustion engine is constant, the intake valve is closed at a fixed point in time in a working cycle. The fixed point in time is defined in such a way that, at this point in time, the cylinder volume is less than the maximum possible cylinder volume. The working cycle of the internal combustion engine is described in detail further below with reference to FIG. 3.

If there is a request for an increase in the engine torque, which is initiated in this example by a gas pedal being stepped on, this torque change request is recognized in step 102. In a subsequent step 103, a target value for the intake manifold pressure in the intake manifold is determined depending on the torque change request. For this purpose, previously stored characteristic maps, which describe the intake manifold pressure as a function of the engine torque, are accessed, and therefore the target value of the intake manifold pressure can be read out. The target value of the intake manifold pressure is greater than an intake manifold pressure prevailing at the point in time of the torque change request.

With the aid of the target value of the intake manifold pressure, a target position of the throttle valve is determined in step 1040. Subsequently, the throttle valve is adjusted according to the determined target value for the throttle valve position (step 1041).

Simultaneously with step 1040, in step 1050, a variable point in time for closing the intake valve as a result of the torque change request is determined depending on the target value of the intake manifold pressure. The determined variable point in time in the engine cycle depending on the target value of the intake manifold pressure is shifted backward relative to the fixed point in time, as is described further below with reference to FIG. 3.

Subsequently, the intake valve is closed for a few engine cycles at the variable point in time (step 1051). As soon as the actual value of the intake manifold pressure corresponds to the target value of the intake manifold pressure, the intake valve is closed again at the fixed point in time (step 1052). Subsequently, a transition occurs into a continuous control process 106 which is similar to the process 101 and in which the intake valve is closed at a fixed point in time.

Figure 2:
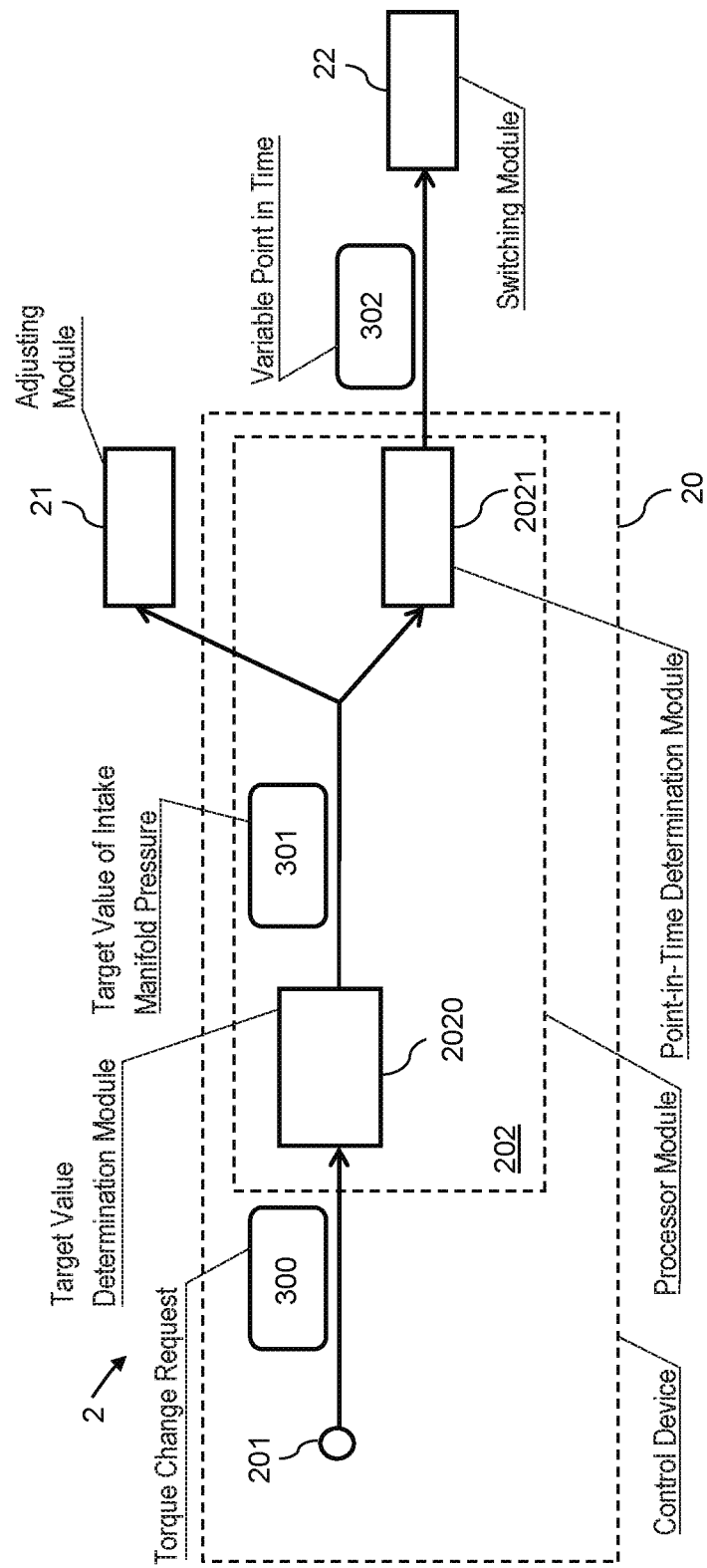
FIG. 2 is a schematic view of a layout of a control device according to the invention.

An internal combustion engine 2 for carrying out a gas exchange in a cylinder is schematically shown in FIG. 2. The internal combustion engine 2 is configured similarly to the internal combustion engine which was described for carrying out the method from FIG. 1. The internal combustion engine 2 also contains a control device 20. The control device 20 includes an interface 201 which can be connected to an ECU. The ECU is configured for processing data associated with a torque change request, which data are generated, for example, when the gas pedal is stepped on, for example, a target torque, and for transmitting the data to the control device 20.

The control device 20 also contains a processor module 202 which contains a target value determination module 2020 and a point-in-time determination module 2021. The processor module 202 is connected to the interface 201, in order to enable access to a torque change request 300 which is provided via the interface 201. The control device 20 is connected to an adjusting module 21 for adjusting the position of the throttle valve, in order to permit the target value 301 to be reported to the adjusting module 21, which target value was determined by the target value determination unit 2020. The target value determination module 2020 and the point-in-time determination module 2021 are coupled to each other in such a way that the point-in-time determination module 2021 receives the target value 301 for the intake manifold pressure, in order to determine the variable point in time 302 on the basis thereof. The control device 20 is also connected to a switching module 22 for switching the intake valve, in order to allow for the transmission of the variable point in time 302 and to close the switching module 22 into the engine cycles after a torque change request 300 at the variable point in time 302.

Figure 3:
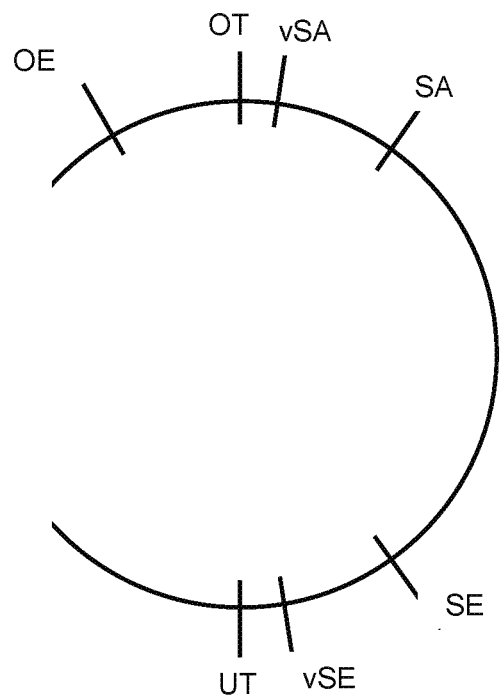
FIG. 3 is a diagram illustrating a shift of the closing times upon a request for a torque increase in accordance with the invention.

FIG. 3 shows a diagram of a sector of a working cycle of the internal combustion engine, which sector shows the opening and closing times of the intake valve and the closing time of the exhaust valve during intake. A sector of a circle is shown, on which top dead center OT and bottom dead center UT are shown. At top dead center OT, the piston of the internal combustion engine is situated in a position in which the cylinder volume is minimal. At bottom dead center UT, the piston is situated in a position in the cylinder such that the cylinder volume is maximal.

Intake takes place between top dead center OT and bottom dead center UT, along the right half of the circle. As shown in FIG. 3 to the left of top dead center OT, the intake valve of the internal combustion engine is opened at an opening time OE, and therefore residual gas remaining in the cylinder can be displaced out of the cylinder by fresh air flowing into the cylinder. A closing time SA of the exhaust valve lies shortly after top dead center OT is reached. Since the internal combustion engine operates according to the Miller cycle, the closing time SE of the intake valve lies before the point at which bottom dead center UT is reached, i.e., in the middle part of the second quadrant of the sector of the circle. The closing time SE of the intake valve is in the state of equilibrium, i.e., a fixed closing time, when a torque change request is not present and state variables are constant. As soon as a torque change request to increase the torque is recognized, the intake valve is closed at a later point in time, i.e., a variable point in time vSE. The variable closing time vSE of the intake valve is indicated in FIG. 3 directly before bottom dead center UT. However, the shift between the variable closing time vSE and the fixed closing time SE can also be less or can decrease as the number of engine cycles after the torque change request increases. One possible dependence of the shift φ of the variable point in time and the intake manifold pressure Ps as the number of working cycles increases or over time t is indicated in FIG. 4.

Figure 4:
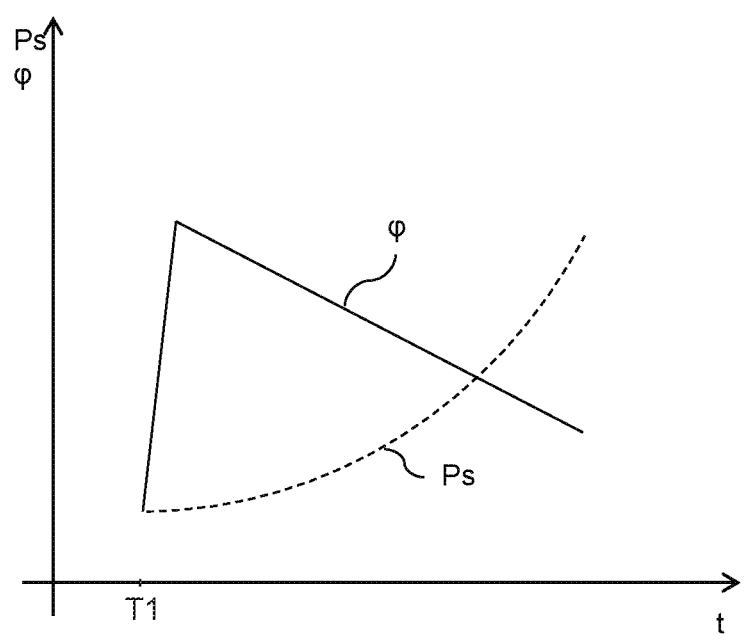
FIG. 4 is a diagram illustrating a temporal progression of the intake manifold pressure and the shift of the closing time of an intake valve across multiple working cycles in accordance with the invention.

FIG. 4 shows that, at the point in time T1, at which a torque change request is recognized, the shift φ of the variable point in time relative to the fixed point in time suddenly increases. The intake manifold pressure Ps increases slowly, however, since it takes a while for the target value of the intake manifold pressure to set in. The shift φ of the variable closing time decreases over time, while the intake manifold pressure increases again.

Due to the shift of the closing time of the intake valve from a fixed closing time SE to the variable closing time vSE, it is therefore possible to respond more quickly to a torque change request than by adjusting the intake manifold pressure. Since the intake manifold pressure is subsequently adapted, the advantages of the Miller cycle can still be utilized during constant driving.

The closing time SA of the exhaust valve can be a fixed point in time in the state of equilibrium, i.e., when there is no torque change request present. If there is a torque change request for an increase in the torque, however, the exhaust valve can be closed at an earlier point in time, i.e., the variable closing time vSA, in order to prevent too much residual gas from flowing back into the cylinder. The variable closing time vSA of the exhaust valve lies between top dead center OT and the fixed closing time SA of the exhaust valve, as indicated in FIG. 3. The shift between the variable closing time vSA of the exhaust valve and the fixed closing time SA of the exhaust valve can also be less or can decrease as the number of engine cycles after the torque change request increases. A progression of the shift of the variable point in time vSA and a progression of the exhaust gas back pressure as the number of working cycles increases or over time t can proceed similarly to the shift φ and the intake manifold pressure Ps in FIG. 4. It is therefore possible to respond quickly to torque change requests.

Figure 5:
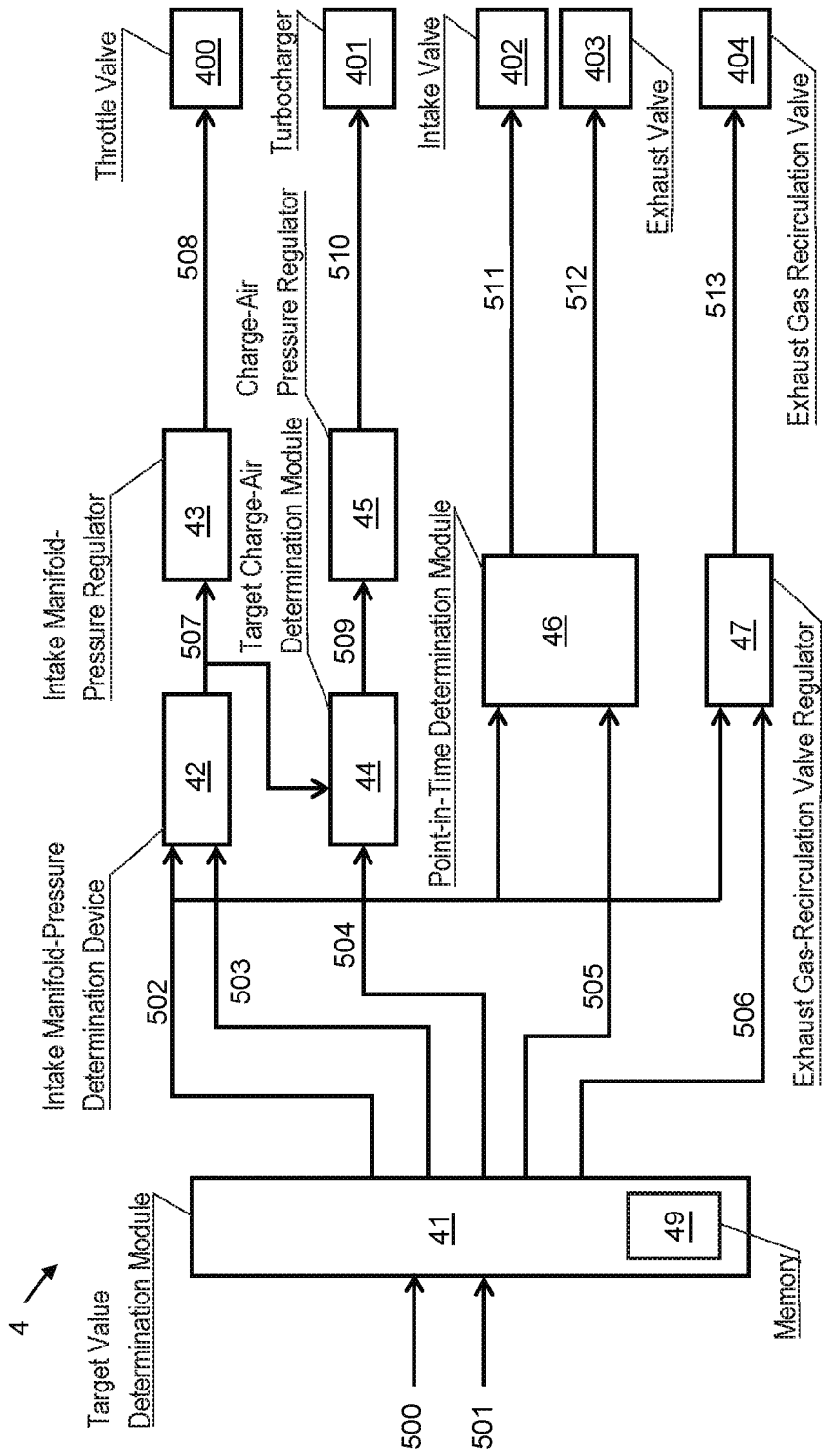
FIG. 5 is a schematic view of an exemplary embodiment of the layout of a control device according to the invention.

The description provided with reference to FIG. 2 merely related to the control of the intake valve of an internal combustion engine. FIG. 5 now shows a further exemplary embodiment of an internal combustion engine 4, which relates to the control of a series of charge-influencing adjusting elements.

The internal combustion engine 4 contains a control device. The control device contains an interface (not shown), via which a current rotational speed 500 and a target torque 501, i.e., a torque change request, are accessed. The interface can be connected, e.g., to an ECU, for this purpose.

The control device also contains a processor module which contains a target value determination module 41. The target value determination module 41 contains a memory 49, which contains the characteristic maps for an air mass, a volumetric efficiency, a pressure differential across the throttle valve, a residual gas content of an internal exhaust gas recirculation, and a residual gas content of an external exhaust gas recirculation. The target value determination module 41 is configured for determining and outputting a target air mass 502, a target volumetric efficiency 503, a target pressure differential 504, a target residual gas content 505 of the internal exhaust gas recirculation, and a target residual gas content 506 of the external residual gas recirculation with the aid of the characteristic maps from the memory 49 and the present rotational speed 500 and the target torque 501 which are received via the interface.

The target air mass 502 and the target volumetric efficiency 503 are forwarded by the target value determination unit 41 to an intake manifold-pressure determination device 42, and therefore the latter calculates a target intake manifold pressure 507. The target intake manifold pressure 507 is transmitted to an intake manifold-pressure regulator 43 which then brings (reference number 508) the throttle valve 400 in the cylinder into a suitable position.

The intake manifold pressure 507 is also transmitted to a target charge-air pressure determination module 44. The target charge-air pressure determination module 44 is also connected to the target value determination module 41, in order to receive the target pressure differential 504. The target charge-air pressure determination module 44 is configured for calculating a target charge-air pressure 509 and transmitting the target charge-air pressure to a charge-air pressure regulator 45. The charge-air pressure regulator 54 is configured for controlling (reference number 510) the turbocharger 401 in the exhaust port.

The control unit of the internal combustion engine 4 also includes a point-in-time determination module 46. The point-in-time determination module 46 is connected to the target value determination module 41 in order to receive therefrom the target air mass 502 and the target residual gas content 505. The point-in-time determination module 46 is configured for determining the switching times of the intake valve (402) and the exhaust valve (403) on the basis of the present rotational speed 500, the target torque 501, the target air mass 502, and the target residual gas content 505 of the internal exhaust gas recirculation, and for adjusting (reference numbers 511, 512), i.e., opening and closing, the intake valve and exhaust valve accordingly.

For this purpose, charge detection models for the fresh air mass and for the residual gas content of the internal exhaust gas recirculation are provided. The influence of the intake valve and of the exhaust valve on the fresh air mass and the residual gas content of the internal exhaust gas recirculation is determined by taking partial derivatives of the charge detection models. The switching times of the intake valve and of the exhaust valve are then determined with the aid of a Jacobian matrix. If a torque change request to increase the torque is present, the closing times of the intake valve and of the exhaust valve are shifted for as long as necessary until the target value of the intake manifold pressure 507 and the target value for the charge-air pressure 510 have set in.

The control device also includes an exhaust gas-recirculation valve regulator 47 which is connected to the target value determination module 41 in order to receive therefrom the target air mass 502 and the target residual gas content in the external exhaust gas recirculation. The exhaust gas-recirculation valve regulator 47 is configured for determining a target position of the exhaust gas recirculation valve and controlling (reference number 513) the exhaust gas recirculation valve 404 accordingly.

In many exemplary embodiments, the control device is configured as a shared processor which carries out the functions of the target value determination module 41, the intake manifold-pressure determination module 42, the target charge-air pressure determination module 44, and the point-in-time determination module 46.

Figure 6:
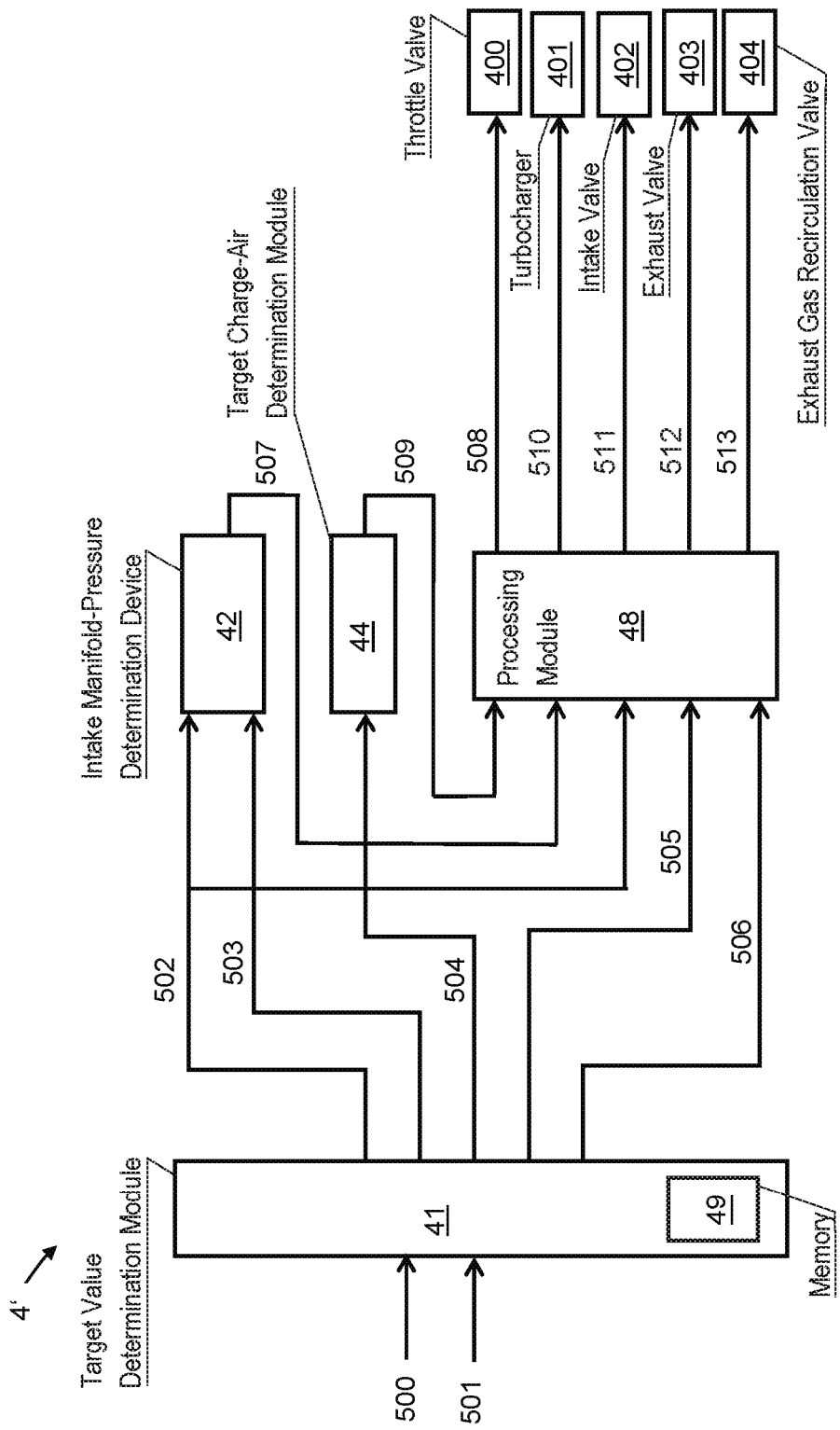
FIG. 6 is a schematic view of a further exemplary embodiment of the layout of a control device according to the invention.

FIG. 6 shows an alternative exemplary embodiment of an internal combustion engine. The internal combustion engine 4' contains a control device. The control device, as is the case for the control device in FIG. 5, contains a target value determination module 41, an intake manifold-pressure determination device 42, and a target charge-air determination module 44. The control device also includes a processing module 48 which determines the position of charge-influencing adjusting elements, i.e., the throttle valve 400, the turbocharger 401, the intake valve 402, the exhaust valve 403, and the exhaust gas recirculation valve 404, on the basis of the present rotational speed 500, the target value torque 501, the target air mass 502, the target volumetric efficiency 503, the target pressure differential 504, the target residual gas content 505 of the internal exhaust gas recirculation, the target residual gas content 506 of the external exhaust gas recirculation, the target intake manifold pressure 507, and the target charge-air pressure 509, and regulates the position accordingly.

For the purpose of determining the position of the adjusting elements, path models are formed, which describe how the intake manifold pressure is influenced by the position of the throttle valve 400, how the charge-air pressure is influenced by the exhaust gas turbocharger 401, i.e., an actuator of the exhaust gas turbocharger, how the adjusting elements respond to changes in their position, and how the fresh air masses and the content of the internal residual gas depend on the positions of the intake valve 402 and of the exhaust valve 403. Charge detection models can be utilized in order to determine the influence of the intake valve and of the exhaust valve on the fresh air mass and the residual gas content of the internal exhaust gas recirculation.

The adjusting elements are subsequently adjusted, on the basis of the path models, via the signals 508, 510, 511, 512 and 513. The adjustment of the intake valve and, if applicable, of the exhaust valve takes place by way of not only adjusting the intake manifold pressure through the use of the throttle valve, but also optimizing the charge composition upon a torque change request by temporally shifting the closing times of the intake valve and, if applicable, the exhaust valve, in order to allow for a faster response to a torque change request than is possible on the basis of the position of the throttle valve.

In summary, the present invention is distinguished by the fact that the charge composition in the cylinder is influenced by multiple actuators and, in this way, can respond quickly to torque change requests.

LIST OF REFERENCE CHARACTERS

10 Method for carrying out a gas exchange
101 On-going control process
102 Recognizing a torque change request
103 Determining a target value of the intake manifold pressure
1040 Determining a target position of the throttle valve
1041 Setting the target position of the throttle valve
1050 Determining a variable point in time
1051 Closing the exhaust valve at the variable point in time
1052 Determining that the target value of the intake manifold pressure corresponds to the actual value
106 Continuous control process
2 Internal combustion engine
20 Control device
201 Interface
202 Processor module
2020 Target value determination module
2021 Point-in-time determination module
21 Adjusting module
22 Switching module
300 Torque change request
301 Target value of the intake manifold pressure
302 Variable point in time
4 Internal combustion engine
41 Target value determination module
42 Intake manifold-pressure determination device
43 Intake manifold-pressure regulator
44 Target charge-air determination module
45 Charge-air pressure regulator
46 Point-in-time determination module
47 Exhaust gas-recirculation valve regulator
48 Processing module
49 Memory
400 Throttle valve
401 Turbocharger
402 Intake valve
403 Exhaust valve
404 Exhaust gas recirculation valve
500 Rotational speed
501 Target torque
502 Target air mass
503 Target volumetric efficiency
504 Target pressure differential
505 Target residual gas content of the internal exhaust gas recirculation
506 Target residual gas content of the external exhaust gas recirculation
507 Target intake manifold pressure
508 Actuating signal for the throttle valve
509 Target charge air pressure
510 Control signal for turbocharger
511 Actuating signal for intake valve
512 Actuating signal for exhaust valve
513 Actuating signal for exhaust gas recirculation valve
OT Top dead center
UT Bottom dead center
OE Opening time of the intake valve
SE Closing time of the intake valve
vSE Variable closing time of the intake valve
SA Closing time of the exhaust valve
vSA Variable closing time of the exhaust valve
Ps Intake manifold pressure
φ Shift of the variable closing time of the intake valve relative to the fixed point in time
t Time

What is claimed is:

1. A method for carrying out a gas exchange in a cylinder of an internal combustion engine, the method comprising:
providing the internal combustion engine such that the cylinder is connected, via a valve, to a gas line section and providing, in the gas line section, an actuator for adjusting a gas pressure in the gas line section, wherein the valve closes at a fixed point in time in a working cycle of the internal combustion engine in case of a constant torque of the internal combustion engine;
recognizing a torque change request;
determining a target value for the gas pressure in the gas line section in dependence on the torque change request and subsequently determining a variable point in time for closing the valve as a result of the torque change request, wherein the variable point in time is shifted in the working cycle relative to the fixed point in time in dependence on the target value of the gas pressure; and controlling the actuator as a result of the torque change request in such a way that the target value of the gas pressure prevails in the gas line section.

2. The method according to claim 1, which comprises determining the target value for the gas pressure by using characteristic maps.

3. The method according to claim 1, which comprises determining the fixed point in time based on a charge detection model.

4. The method according to claim 1, which comprises closing the valve at the variable point in time during at least one working cycle in response to the torque change request.

5. The method according to claim 1, which comprises closing the valve at the variable point in time in a first working cycle after the torque change request in response to the torque change request and, in directly subsequent working cycles, closing the valve at adapted points in time, wherein the adapted points in time lie between the variable point in time and the fixed point in time.

6. The method according to claim 1, which comprises closing the valve at the variable point in time in response to the torque change request until an actual value for the gas pressure reaches the target value for the gas pressure, and subsequently closing the valve at the fixed point in time.

7. The method according to claim 1, which comprises closing the valve at adapted points in time in response to the torque change request, wherein the adapted points in time lie in an interval between the variable point in time and the fixed point in time and wherein the interval includes the variable point in time, until an actual value for the gas pressure reaches the target value for the gas pressure, and subsequently closing the valve at the fixed point in time.

8. The method according to claim 1, wherein:
the valve is an intake valve;
the gas line section is an intake manifold connected to the cylinder via the intake valve; and
the actuator for adjusting a gas pressure in the gas line section is a throttle valve for adjusting an intake manifold pressure in the intake manifold, wherein the throttle valve is disposed in the intake manifold.

9. The method according to claim 1, wherein:
the valve is an exhaust valve;
the gas line section is an exhaust port section connected to the cylinder via the exhaust valve; and
the actuator for adjusting a gas pressure in the gas line section is an exhaust gas turbocharger for adjusting an exhaust gas back pressure in the exhaust port section, wherein the exhaust gas turbocharger is disposed in the exhaust port section.

10. The method according to claim 1, which comprises:
providing the valve as an exhaust valve;
providing the gas line section as an exhaust port section connected to the cylinder via the exhaust valve;
providing the actuator for adjusting a gas pressure in the gas line section as an exhaust gas turbocharger for adjusting an exhaust gas back pressure in the exhaust port section, wherein the exhaust gas turbocharger is disposed in the exhaust port section;
connecting the cylinder, via an intake valve, to an intake manifold;
providing a throttle valve for adjusting an intake manifold pressure, wherein the throttle valve is provided in the intake manifold;
closing the intake valve at a fixed point in time in the working cycle in case of a constant torque of the internal combustion engine;
determining, in addition to determining the target value for the gas pressure in the gas line section, a target value for the intake manifold pressure in the intake manifold in dependence on the torque change request, wherein the target value for the gas pressure in the gas line section is a first target value and wherein the target value for the intake manifold pressure in the intake manifold is a second target value; and
determining a variable point in time for closing the intake valve as a result of the torque change request, wherein the variable point in time is shifted in the working cycle relative to the fixed point in time in dependence on the target value of the intake manifold pressure.

11. The method according to claim 10, wherein the torque change request includes a request for increasing an engine torque, and the variable point in time for closing the intake valve lies later in the working cycle than the fixed point in time.

12. The method according to claim 10, which comprises providing the fixed point in time in an intake phase of the working cycle before a maximum volume of the cylinder is reached.

13. The method according to claim 1, which comprises additionally providing an adjusting device for influencing the gas exchange and controlling the adjusting device by determining a target value for a position of the adjusting device in dependence on the torque change request, wherein the target value for the gas pressure in the gas line section is a first target value and wherein the target value for the position of the adjusting device is a second target value.

14. A control device for carrying out a gas exchange in a cylinder of an internal combustion engine, wherein the cylinder is connected via a valve to a gas line section, wherein an actuator for adjusting a gas pressure in the gas line section is provided in the gas line section, wherein the valve closes at a fixed point in time in a working cycle of the internal combustion engine in case of a constant torque of the internal combustion engine, the control device comprising:
an interface for receiving a torque change request;
a processor module operatively connected to said interface;
said processor module recognizing a torque change request;
said processor module determining a target value for the gas pressure in the gas line section in dependence on the torque change request, and said processor module subsequently determining a variable point in time for closing the valve as a result of the torque change request, wherein the variable point in time is shifted in the working cycle relative to the fixed point in time in dependence on the target value of the gas pressure; and
said processor module effecting a control of the actuator as a result of the torque change request such that the target value of the gas pressure prevails in the gas line section.

15. The control device according to claim 14, further including a memory, said memory storing at least one of the target value for the gas pressure in the gas line section in dependence on the torque change request and information for determining the variable point in time in dependence on the target value for the gas pressure.

16. An internal combustion engine, comprising:
a cylinder;
a valve;
a gas line section, said cylinder being connected to said gas line section via said valve;

an actuator for adjusting a gas pressure in said gas line section, said actuator being provided in said gas line section;

a control device for carrying out a gas exchange in said cylinder;

said control device including a processor module and an interface, said interface being configured to receive a torque change request;

said processor module recognizing a torque change request, said processor module determining a target value for the gas pressure in said gas line section in dependence on the torque change request, and said processor module subsequently determining a variable point in time for closing said valve as a result of the torque change request, wherein the variable point in time is shifted in a working cycle of the internal combustion engine relative to a fixed point in time in dependence on the target value of the gas pressure; and said control device controlling said valve such that said valve closes at the fixed point in time in the working cycle of the internal combustion engine in case of a constant torque of the internal combustion engine and such that said valve closes at the variable point in time in response to the torque change request; and said control device effecting a control of said actuator as a result of the torque change request such that the target value of the gas pressure prevails in the gas line section.

17. The internal combustion engine according to claim 16, wherein said control device includes a memory, said memory stores at least one of the target value for the gas pressure in the gas line section in dependence on the torque change request and information for determining the variable point in time in dependence on the target value for the gas pressure.

18. The internal combustion engine according to claim 16, further including an adjusting device for influencing the gas exchange, said adjusting device being controlled by determining a target value for a position of the adjusting device in dependence on the torque change request, wherein the target value for the gas pressure in the gas line section is a first target value and wherein the target value for the position of the adjusting device is a second target value.

19. The internal combustion engine according to claim 16, wherein:

said valve is an intake valve;

said gas line section is an intake manifold connected to said cylinder via said intake valve; and said actuator for adjusting a gas pressure in said gas line section is a throttle valve for adjusting an intake manifold pressure in said intake manifold, wherein said throttle valve is disposed in said intake manifold.

20. The internal combustion engine according to claim 16, wherein:

said valve is an exhaust valve;

said gas line section is an exhaust port section connected to said cylinder via said exhaust valve; and said actuator for adjusting a gas pressure in said gas line section is an exhaust gas turbocharger for adjusting an exhaust gas back pressure in said exhaust port section, wherein said exhaust gas turbocharger is disposed in said exhaust port section.

* * * * *